United States Patent [19]

Meeker

[11] Patent Number: 4,958,887
[45] Date of Patent: Sep. 25, 1990

[54] INFANT CARRIER WITH HOOKS FOR USE WITH SHOPPING CARTS

[75] Inventor: Paul K. Meeker, Aurora, Ohio

[73] Assignee: Spalding & Evenflo Co., Inc., Tampa, Fla.

[21] Appl. No.: 358,965

[22] Filed: May 30, 1989

[51] Int. Cl.$^5$ .............................................. A47D 1/10
[52] U.S. Cl. ................................... 297/250; 248/307; 280/33.993
[58] Field of Search .................. 297/250; 24/599, 683, 24/685; 248/307, 305, 306; 410/107, 111; 280/33.992, 33.993

[56] References Cited

U.S. PATENT DOCUMENTS

| | | | |
|---|---|---|---|
| 565,321 | 8/1896 | Basden | 24/685 |
| 861,347 | 7/1907 | Anderson | 297/250 X |
| 2,193,699 | 3/1940 | Sadler | 248/307 |
| 2,729,417 | 1/1956 | Maynard | 410/111 |
| 4,598,945 | 7/1986 | Hopkins | 297/250 |
| 4,834,404 | 5/1989 | Wood | 297/250 X |

FOREIGN PATENT DOCUMENTS

| | | | |
|---|---|---|---|
| 2844189 | 4/1980 | Fed. Rep. of Germany | 287/250 |
| 2182000 | 5/1987 | United Kingdom | 280/33.992 |

*Primary Examiner*—Peter R. Brown

[57] ABSTRACT

An infant carrier adapted to be releasably mounted onto a shopping cart and positively secured thereto comprising in combination a main body portion for receiving a child and having a head end and a foot end and a central section therebetween and having side walls with generally vertically extending recesses on the exterior surfaces of the sidewalls and having pockets on the interior surfaces of the sidewalls; a button positioned within each recess, each button adapted for movement by an operator and with a projection extending inwardly thereof, a hook positioned within each pocket, each hook having an aperture for receiving a projection for movement of the hook with the button for coupling the hooks with a support wire of a shopping cart; and spring means coupling each projection with the base for urging the button and hook to the retracted position to thereby positively secure the hook and carrier with respect to the shopping cart.

4 Claims, 3 Drawing Sheets

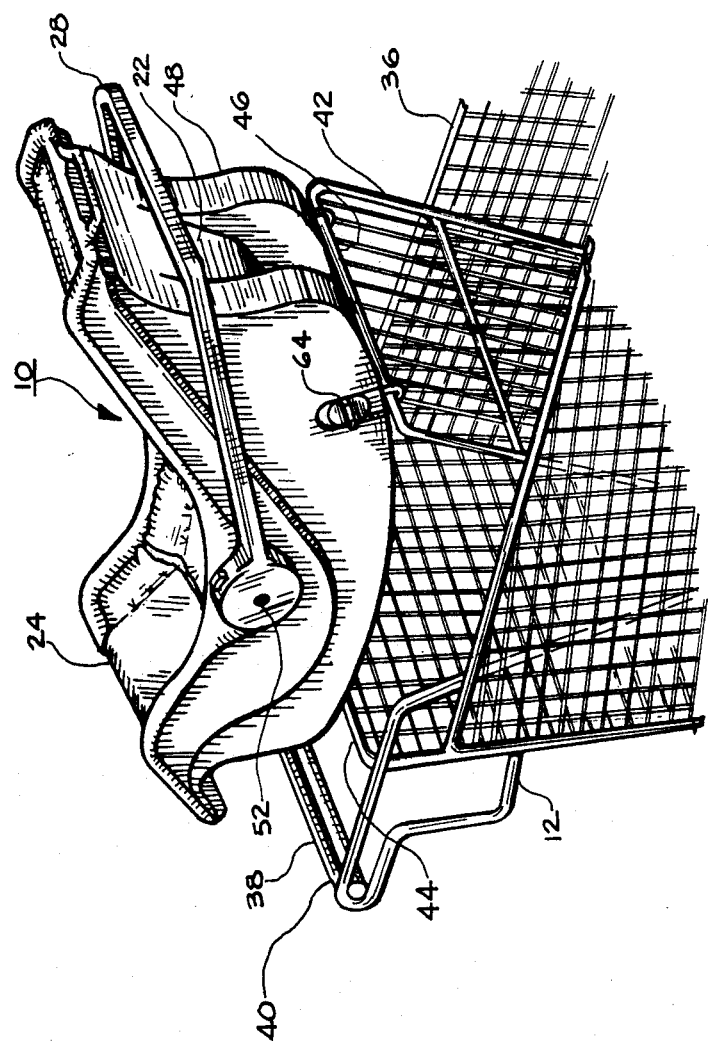

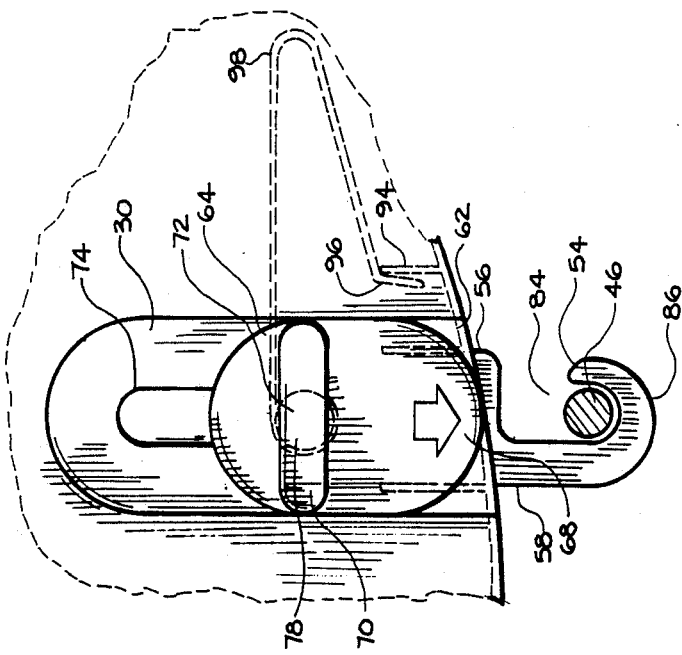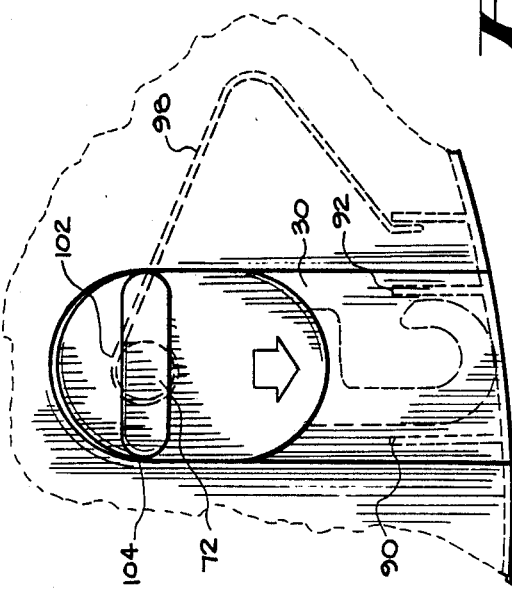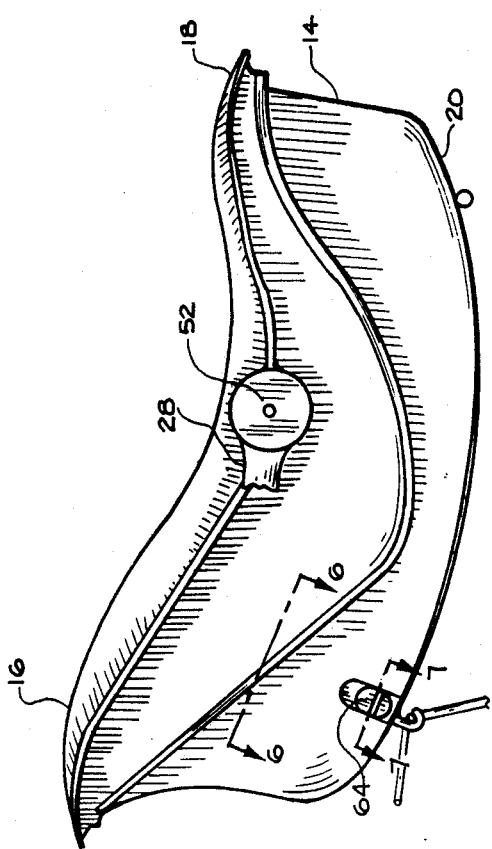

INFANT CARRIER WITH HOOKS FOR USE WITH SHOPPING CARTS

Summary of the Invention

This invention relates to an infant carrier for use with shopping carts and, more particularly, to infant carriers adapted to be releasably coupled with respect to shopping carts.

Background of the Invention

Various types of infant carriers have been developed and utilized for supporting an infant in a reclined position. The carrier normally includes a mat for infant comfort and a safety strap for restraining the child in such reclined position.

Various attachment devices have also been developed and utilized to secure the carrier in one position or another for the convenience of the mother. One type of attachment device is for supporting the carrier with respect to a shopping cart while the mother shops at a grocery store. Without such attachment devices, the mother might merely set the carrier with child on the seat portion of the shopping cart adjacent its rearmost end. Such an arrangement, however, suffers from problems of safety since inadvertent bumping, sharp corners, or movement of the infant might tip the carrier so that it would fall from the shopping cart and injure the child.

Various types of attachment devices are disclosed in the prior art for positively securing the infant carrier to the shopping cart. Consider, for example, U.S. Pat. No. 3,351,380 to Sprague; U.S. Pat No. 4,598,945 to Hopkins; and U.S. Pat No. 4,651,366 to Lande. In the Sprague patent, additional attachment mechanisms o the lower face of the infant carrier include C-shaped fingers for receiving parts of a shopping cart on which it is to be releasably secured. The fingers are spring biased to retain the clip and shopping cart in proper position. Unfortunately, however, such C-shaped fingers weaken through time to increase the risk of inadvertent separation of the carrier from the cart. Further, the additional attachment mechanisms on the lower face of the carrier increase cost and create an inconvenience when using such carrier for other purposes.

The Patent to Hopkins discloses an arrangement including straps and buckles secured with respect to the lower face of the carrier. The straps are located to span the entire lower face of the carrier including portions of the upper extending front and rear faces. Like the apparatus disclosed by Sprague, the Hopkins apparatus has excess components in the form of straps and buckles which create an inconvenience to the user when the carrier is not utilized in association with a shopping cart. Further, the use of straps extending the entire length of the lower face of the carrier allows for the lateral sliding of the carrier with respect to the shopping cart to increase the chance for accidental movement and consequent harm to the infant.

Lastly, the Lande patent shows a complex arrangement for coupling a convertible bed-like device to location within the basket of the shopping cart. This device is a totally different item of commerce than the more conventional and commercially available infant carriers and does not allow for the utility of the infant carrier independent of its use in a shopping cart.

As a collateral matter, U.S. Pat. No. 2,644,506 to Pollock and U.S. Pat. No. 3,473,722 to Nilson disclose clip type mechanisms which have been found useful in positively securing one member to another. These prior patents, however, are shown in environments unrelated to shopping carts. The prior art infant carriers and clips are different in significant respects from the infant carrier and attachment devices as disclosed herein. Although many such advances in infant carriers are noteworthy to one extent or another, none achieves the objective of an efficient, reliable, inexpensive infant carrier designed for positive, releasable securement to a shopping cart.

As illustrated by the great number of prior patents and known devices, efforts are continually being made in an attempt to develop an improved infant carrier which is more efficient, convenient to use, reliable and economical. None of these previous efforts, however, provides the benefits attendant with the present invention. Additionally, prior techniques do not suggest the inventive combination of component elements as disclosed and claimed herein. The present invention achieves its intended objects, purposes and advantages over the prior art through a new, useful and unobvious combination of component elements which are simple to use, through the utilization of a minimum number of functioning parts, at a reasonable cost to manufacture and by employing only readily available materials.

Therefore, it is an object of this invention to provide an improved infant carrier adapted to be releasably mounted onto a shopping cart and positively secured thereto. The carrier comprises a main body portion for receiving a child and having a head end and a foot end and a central section therebetween and having sidewalls with generally vertically extending recesses on the exterior surfaces of the sidewalls and having pockets on the interior surfaces of the sidewalls; a button positioned within each recess, each button adapted for movement by an operator and with a projection extending inwardly thereof; a hook positioned within each pocket, each hook having an aperture for receiving a projection for movement of the hook with the button for coupling the hooks with a support wire of a shopping cart; and spring means coupling each projection with the base for urging the button and hook to the retracted position to thereby positively secure the hook and carrier with respect to the shopping cart.

It is another object of this invention to releasably couple infant carriers to shopping carts through positive securement mechanisms.

It is a further object of this invention to ease the manner by which a shopper may safely locate an infant while shopping.

The foregoing has outlined some of the more pertinent objects of the invention. These objects should be construed as merely illustrative of some of the more prominent features and applications of the attendant invention. Many other beneficial results can be obtained by applying the disclosed invention in a different manner or by modifying the invention within the scope of the disclosure. Accordingly, other objects and a fuller understanding of the invention may be had by referring to the Summary of the Invention and Detailed Description of the Preferred Embodiment in addition to the scope of the invention defined by the claims taken in conjunction with the accompanying drawings.

Summary of the Invention

The invention is defined by the appended claims with the specific embodiment shown in the attached drawings. For the purposes of summarizing the invention, the invention may be incorporated into an improved infant carrier adapted to be releasably mounted onto a shopping cart and positively secured thereto comprising in combination a main body portion for receiving a child and having a head end and a foot end and a central section therebetween and having sidewalls with generally vertically extending recesses on the exterior surfaces of the sidewalls and having pockets on the interior surfaces of the sidewalls; a button positioned within each recess, each button adapted for movement by a operator and with a projection extending inwardly thereof; a hook positioned within each pocket, each hook having an aperture for receiving a projection for movement of the hook with the button for coupling the hooks with a support wire of a shopping cart; and spring means coupling each projection with the base for urging the button and hook to the retracted position to thereby positively secure the hook and carrier with respect to the shopping cart. The buttons and hooks are located adjacent to the head end of the body portion for coupling with a support wire remote from the handle end of the shopping cart. A portion of the infant carrier adjacent to the foot end is adapted to be supported upon a support wire adjacent to the shopping cart.

The invention may also be incorporated into an improved clip adapted to be mounted with respect to an infant carrier for coupling the infant carrier to a shopping cart comprising a button having an exposed exterior surface for movement by an operator; hook secured with respect to the button for movement therewith, a pocket for guiding the movement of the hook and a slot for guiding the movement of the button and hook between a retracted inoperative position and an exposed operative position, and spring means urging the button and hook to the retracted inoperative position, away from the extended operative position for hooking onto a wire of shopping cart. The hook is of a flat rigid material with elongated, generally vertical edges and with a notch extending inwardly and downwardly from one vertical edge. The recess and pocket are spaced from each other with an elongated, generally vertical slot extending therebetween, and with a circular projection extending from the button through the slot and coupled with the hook. The spring means is formed of a wire formed in a generally V-shaped configuration with on end fixedly secured adjacent to the button and with the other end secured to the projection.

Lastly, the invention may be incorporated into an improved infant carrier adapted to be releasably mounted onto a shopping cart and positively secured thereto. The infant carrier comprises a main body portion for receiving a child and having a head end and a foot end and a central section therebetween and having sidewalls with generally vertically extending recesses on the exterior surfaces of the sidewalls and having pockets on the interior surfaces of the sidewalls. A button with an outwardly extending tab is positioned within each recess, each button and tab is adapted for movement by an operator and with a projection extending inwardly thereof. A hook is positioned within each pocket, each hook being of a flat rigid material with elongated, generally vertical edges, each hooking having an aperture for receiving a projection for movement of the hook with the button for coupling the hooks with a support wire of a shopping cart, each hook also having an opening extending inwardly and downwardly for receiving a support wire of the shopping cart. Spring means in a V-shaped configuration couple each projection with the base for urging the button and hook to the retracted position to thereby positively secure the hook and carrier with respect to the shopping cart. The buttons and hooks are located adjacent to the head end of the body portion for coupling with support wire remote from the handle end of the shopping cart. A portion of the infant carrier adjacent to the foot end is adapted to be supported upon a support wire adjacent to the shopping cart. The foregoing has outlined rather broadly the more pertinent and important features of the present invention in order that the detailed description of the invention that follows can be better understood so that the present contribution to the art can be more fully appreciated. Additional features of the invention will be described hereinafter which form the subject of the claims of the invention. It should be appreciated by those skilled in the art that the conception and disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

Brief Description of the Drawings

For a fuller understanding of the nature and objects of the invention, reference should be had to the following detailed description taken in conjunction with the accompanying drawings in which:

FIG. 1 is a perspective illustration showing an infant carrier constructed in accordance with the principles of the present invention operatively coupled with respect to a shopping cart.

FIG. 2 is a side elevational view of the infant carrier of FIG. 1 with its hook in position with respect to a shopping cart.

FIG. 3 is an enlarged view of the hook and related mechanisms shown in FIG. 2.

FIG. 4 is a view similar to FIG. 3 but illustrating the hook in a raised inoperative position.

Similar reference numerals refer to similar parts throughout the several Figures.

Detailed Description of the Invention

Figure 5:
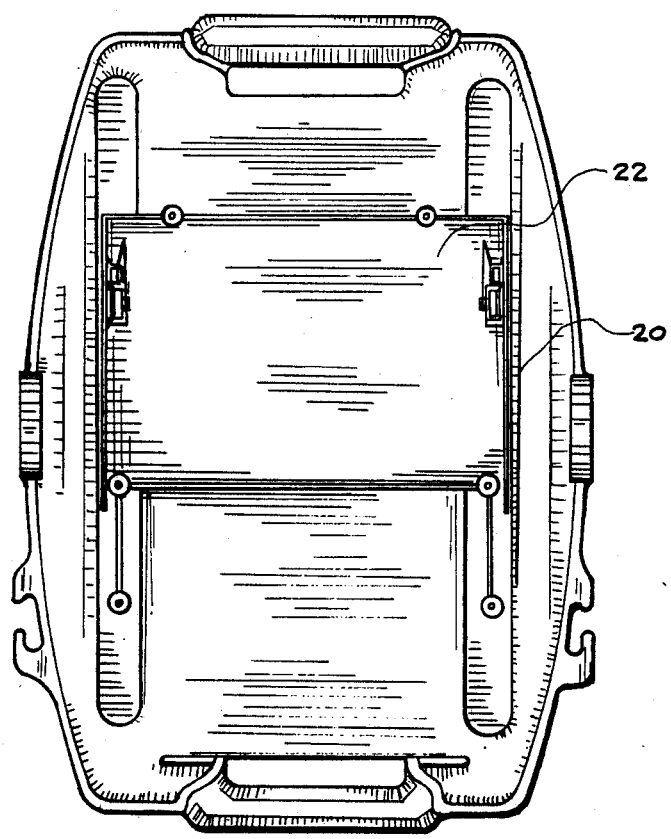
FIG. 5 is a bottom view of the shopping cart of FIGS. 1 and 2.
Figure 6:
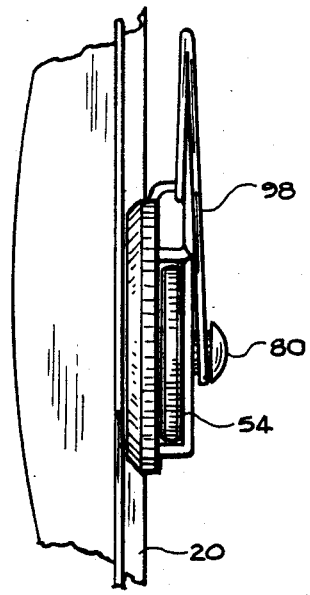
FIG. 6 is an enlarged showing of the clip taken along line 6—6 of FIG. 5.
Figure 7:
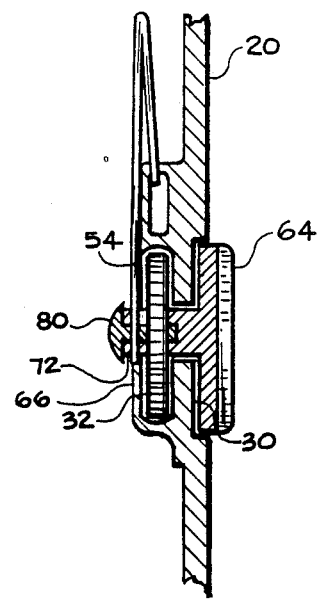
FIG. 7 is a sectional view of the clip taken through line 7—7 of FIG. 5.

With reference to FIG. 1 there is shown an infant carrier 10 constructed in accordance with the principles of the present invention. The infant carrier is shown releasably secured with respect to a shopping cart 12. Greater details of the infant carrier 10 as well as its mode of construction and use may be had by reference to FIGS. 2-7.

The shopping cart 12 to which the infant carrier 10 is coupled is typical of the type of shopping carts in wide use today. The infant carrier 10, however, is modified so that it is adapted to be coupled with respect to such typical shopping carts as well as to a wide variety of other types of shopping carts and other devices with wire frames to which the infant carrier may be secured. The basic components of the infant carrier 10 ar generally conventional except for the attachment mechanisms for securement to the shopping cart 12.

The infant carrier 10 is of conventional construction. It includes a main body portion or shell 14 extending from a head end 16 to a foot end 18 and is constructed of the length greater than the length of the child to be supported therein. The shell 14 is contoured along its length in serpentine fashion for greater child comfort. Side walls 20 extend upwardly from both side edges of the central extent 22 to restrain the child against lateral movement. A soft pad 24 is utilized upon which the child may be placed for greater comfort. Elongated aperture extend through the shell and pad for the passage of a belt or belts with buckles for restraining the child in the carrier in the conventional manner.

The carrier may be provided with a handle 28 in an inverted U-shaped configuration. The handle is coupled by pins 52 extending through the sidewalls 20 of the carrier 20 at a central portion of its length.

The carrier 10 is preferably fabricated of a rigid impact resistant, high polymer plastic such as polyethylene, polyvinyl chloride, or the like.

In addition to its conventional parts, recesses 30 and pockets 32 are formed in each sidewall 20 of the carrier closer the head end 16 than the foot end 18. These support the attachment mechanisms for effecting coupling the carrier 20 and cart 12 in a manner as will be more fully described.

The shopping cart 12 is shown as conventional with a basket 36 formed of rigid wires supported on wheels. The shopper operates the cart through a handle 38 at the handle end 40. A small pivotable seat 42 is located within the basket 36 at the hanlde end 40. The seat 42 is for supporting a seated child. The end of the seat 42 adjacent to the handle end has a support wire 44 while an associated support wire 46 is at the remote end 48 of the seat. The infant carrier 10 is received upon the two support wires 44 and 46 of the shopping cart 12 during operation and use.

Secured with respect to the infant carrier 10 adjacent to the head end 16 are a pair of J-shaped hooks 54 reciprocable between a retracted, inoperative position, as seen most readily in FIG. 4. The J-shaped hooks 54 are also positionable in an extended operable position as most readily seen in FIG. 3. The J-shaped hooks 54 are flat rigid members of metal or plastic constructed in a generally elongated configuration with parallel front and rear edges 56 and 58. They are independently operable and are located in pockets 32 in opposite sidewalls 20 of the carrier adjacent to the head portion 16 to be slid into and out of the pockets of the carrier walls. When retracted, the infant carrier 10 can function in its conventional manner without interference from extraneous mechanisms.

The carrier 10 is further modified from the conventional design by having formed therein recesses 30 on its exterior surfaces 62 of the sidewalls 20 to constitute guiding surfaces for buttons 64. The recesses 30 are parallel and coextensive with the pockets 32 which are on the interior surfaces 66 of the side walls 20. The attachment mechanisms hook and button slidably reciprocate in the pocket and recess to move between the extended, operative position and retracted, in operative position by an operator, such as a mother.

The button 64 has an oval shaped base 68 generally located within the recess and with an outwardly extending tab 70 centrally located on the oval and extending outwardly of the recess for ready contact by the operator. The interior surface of the button is formed with a circular projection 72 mounted within a slot 74 extending through the carrier and terminating in the pocket of the carrier wall. The upper portion of the J-shaped hook is formed with an aperture 78 for being mounted in the pocket with the circular projection of the buttons extending therethrough. A pin 80 is press-fit and adhered into a central aperture of the projection for securing the hook with respect to the button in proper operative position.

As referred to hereinabove, the J-shaped hook 54 is formed with an opening 84 in its edge facing away from the head end 16. The opening extends inwardly and downwardly to a lower semicircular extent 86 which is adapted t receive the support wire at the remote end of the shopping cart seat so as to accommodate its intended function. The semicircular extend 86 has a radius of curvature generally adapted to conform with that of the wire 46 at the remote end 48 of the seat 42. Upwardly extending ribs 90, 92 from the body of the carrier assist in guiding the movement of the hook 54 between its extended and retracted position. A third upstanding rib 94 adjacent to the ribs 90, 92 is adapted to receive an end 96 of a wire spring 98.

The wire spring 98 is supported in a sideways "V" configuration as best seen in FIGS. 3 and 4. The upper end 102 of the spring is formed as a loop 104 to receive the projection 72 of the button. It is held in place by the head 108 of the pin 80. The resilience of the spring is such as to resiliently urge the projection 72, hook 54 and button 64 upwardly to the retracted position. Upon applying a downward force to the tabs 70 and buttons 64, the buttons 64 and hooks 54 may be slid within the recesses 30 and pockets 32 against the urging of the spring 98 to move the hooks to the extended positions. At this time, the carrier 10 would be placed on the shopping cart 12, hooking the openings 84 of the hooks around the adjacent support wire 46 of the shopping cart. The operator would release the buttons 64 so that they would tend to move to the retracted position. Such motion would positively secure the hooks and carriers with respect to the shopping cart to effect the intended safety during operation and use.

The final operative position is best seen in FIGS. 1 and 2 with the semicircular extent 86 of the hook 54 secured to the support wire 46 of the cart and with the other support wire 44 freely supporting the infant carrier adjacent its foot end 18. Release is effected by the operator depressing the buttons 64 so that the hooks and carrier may be slid out of coupling engagement. The hooks move away from the handle 28 so that the opening of the hook moves past the support wire for total disengagement of the infant carrier from the shopping cart.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. An infant carrier adapted to be releasably mounted onto a shopping cart and positively secured thereto comprising in combination:
    a main body portion for receiving a child and having a head end and a foot end and a central section therebetween and having side walls with generally vertically extending recesses on the exterior surfaces of the sidewalls and having pockets on the interior surfaces of the sidewalls;
    a button positioned within each recess, each button adapted for movement by an operator and with a projection extending inwardly thereof;
    a hook positioned within each pocket, each hook having an aperture for receiving one of said projections for movement of the hook with the button for coupling the hooks with a support wire of a shopping cart; and
    spring means coupling each projection with the base for urging the button and hook to the retracted position to thereby positively secure the hook and carrier with respect to the shopping cart.

2. The infant carrier as set forth in claim 1 wherein the buttons and hooks are located adjacent to the head end of the body portion for coupling with a support wire remote from the handle end of the shopping cart.

3. The infant carrier as set forth in claim 2 wherein a portion of the infant carrier adjacent to the foot end is adapted to be supported upon a support wire adjacent to the handle end of the shopping cart.

4. An infant carrier adapted to be releasably mounted onto a shopping cart and positively secured thereto comprising in combination:
    a main body portion for receiving a child and having a head end and a foot end and a central section therebetween and having sidewalls with generally vertically extending recesses on the exterior surfaces of the sidewalls and having pockets on the interior surfaces of the side walls;
    a button with an outwardly extending tab positioned within each recess, each button and tab adapted for movement by an operator and with a projection extending inwardly thereof;
    a hook positioned within each pocket, each hook being of a flat rigid material with elongated, generally vertical edges, each hook having an aperture for receiving one of said projections for movement of the hook with the button for coupling the hooks with a support wire of a shopping cart, each hook also having an opening extending inwardly and downwardly for receiving a support wire adjacent to the handle end of the shopping cart; and
    spring means in a V-shaped configuration coupling each projection with the base for urging the button and hook to the retracted position to thereby positively secure the hook and carrier with respect to the shopping cart, the buttons and hooks being located adjacent to the head end of the body portion for coupling with a support wire remote from the handle end of the shopping cart, a portion of the infant carrier adjacent to the foot end being adapted to be supported upon a support wire adjacent to the shopping cart.

* * * * *